(12) United States Patent
Guérin

(10) Patent No.: US 12,219,268 B2
(45) Date of Patent: *Feb. 4, 2025

(54) INTELLIGENT SENSOR SWITCH DURING RECORDING

(71) Applicant: GoPro, Inc., San Mateo, CA (US)

(72) Inventor: Guillaume Matthieu Guérin, Chatillon (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,065

(22) Filed: May 9, 2023

(65) Prior Publication Data

US 2023/0276139 A1 Aug. 31, 2023

Related U.S. Application Data

(63) Continuation of application No. 17/465,808, filed on Sep. 2, 2021, now Pat. No. 11,671,716, which is a continuation of application No. 16/808,576, filed on Mar. 4, 2020, now Pat. No. 11,115,590.

(51) Int. Cl.
*H04N 23/80* (2023.01)
*H04N 9/64* (2023.01)
*H04N 9/68* (2023.01)
*H04N 23/88* (2023.01)
*H04N 25/42* (2023.01)

(52) U.S. Cl.
CPC .............. *H04N 23/80* (2023.01); *H04N 9/646* (2013.01); *H04N 9/68* (2013.01); *H04N 23/88* (2023.01); *H04N 25/42* (2023.01)

(58) Field of Classification Search
CPC .......... H04N 23/80; H04N 9/646; H04N 9/68; H04N 23/88; H04N 25/42; H04N 23/45; H04N 23/51; H04N 23/60
See application file for complete search history.

(56) References Cited

U.S. PATENT DOCUMENTS

| | | | |
|---|---|---|---|
| 6,025,870 A * | 2/2000 | Hardy | H04N 5/77 348/E7.083 |
| 9,176,559 B2 | 11/2015 | Oh | |
| 9,906,715 B2 | 2/2018 | Yang | |
| 10,200,623 B1 * | 2/2019 | Baldwin | H04N 23/63 |
| 10,250,811 B2 | 4/2019 | Sokeila | |
| 11,115,590 B1 * | 9/2021 | Guérin | H04N 23/45 |
| 11,671,716 B2 * | 6/2023 | Guérin | H04N 25/42 348/222.1 |

(Continued)

FOREIGN PATENT DOCUMENTS

JP       2003125391 A  *  4/2003

*Primary Examiner* — Michael Lee
(74) *Attorney, Agent, or Firm* — Young Basile Hanlon & MacFarlane, P.C.

(57) ABSTRACT

An image capture device may process first frames from a first image sensor obtained at a first frame rate and store the processed first frames in a memory. The image capture device may obtain first camera control statistics based at least on partially processed second frames from a second image sensor obtained at a second frame rate. The image capture device may switch a capture mode to obtain third frames at the second frame rate from the first image sensor and to obtain fourth frames at the first frame rate from the second image sensor.

20 Claims, 11 Drawing Sheets

(56) References Cited

U.S. PATENT DOCUMENTS

| | | | |
|---|---|---|---|
| 2003/0117486 A1* | 6/2003 | Ferren | H04N 7/147 348/E7.083 |
| 2007/0024737 A1 | 2/2007 | Nakamura | |
| 2008/0084482 A1 | 4/2008 | Hansson | |
| 2011/0157334 A1 | 6/2011 | Kim | |
| 2014/0078343 A1 | 3/2014 | Dai | |
| 2016/0366398 A1 | 12/2016 | Chen | |
| 2018/0343382 A1* | 11/2018 | Cohen | H04N 23/667 |
| 2019/0141307 A1* | 5/2019 | Youn | H04N 23/62 |
| 2020/0077031 A1 | 3/2020 | Lee | |
| 2020/0084387 A1* | 3/2020 | Baldwin | H04N 5/33 |
| 2020/0120284 A1 | 4/2020 | Kini | |
| 2020/0128190 A1 | 4/2020 | Yao | |
| 2021/0176405 A1 | 6/2021 | Ishii | |
| 2021/0281751 A1 | 9/2021 | Guérin | |
| 2021/0400191 A1 | 12/2021 | Guérin | |

\* cited by examiner

INTELLIGENT SENSOR SWITCH DURING RECORDING

CROSS-REFERENCE TO RELATED APPLICATION(S)

This application is a continuation of U.S. Application patent Ser. No. 17/465,808, filed Sep. 2, 2021, which claims priority to and the benefit of U.S. Applications patent Ser. No. 16/808,576, filed Mar. 4, 2020, now U.S. Pat. No. 11,115,590, the entire disclosures of which are hereby incorporated by reference.

TECHNICAL FIELD

This disclosure relates to multiple sensor image capture devices.

BACKGROUND

An image capture device with two image sensors may have each image sensor facing different scenes, and a user may record from one image sensor at a time. If the image capture device switches from recording from one image sensor to recording from the other image sensor, a latency is introduced into the recorded video where the camera controls between the two sensors converge before having a stable image. A typical solution may be to stream from both sensors and launch camera controls for both sensors. However, this solution would require substantial processing power and reduce run times. Accordingly, it would be desirable to have a method and apparatus to reduce latency during an image sensor switch, without sacrificing run times.

SUMMARY

Disclosed herein are implementations of intelligent switching of image sensors during recording. In an aspect, an image capture device may include an image signal processor. The image signal processor may be configured to process first frames obtained from a first image sensor and store the processed first frames in the memory. The first frames may be obtained at a first frame rate. The image signal processor may be configured to obtain first camera control statistics based at least on partially processed second frames from a second image sensor. The second frames may be obtained at a second frame rate. Responsive to an indication to switch from the first image sensor to the second image sensor, the first image sensor may be further configured to obtain third frames at the second frame rate and the second image sensor may be further configured to obtain fourth frames at the first frame rate.

In another aspect, an image capture device may include a first image sensor, a second image sensor, a memory, a first image signal processor, and a second image signal processor. The first image sensor may be configured to obtain first frames. The first frames may be obtained at a first frame rate. The second image sensor may be configured to obtain second frames. The second frames may be obtained at a second frame rate. The first image signal processor may be configured to process the first frames from the first image sensor and store the processed first frames in the memory. The second image signal processor may be configured to partially process the second frames from the second image sensor to obtain first camera control statistics. Responsive to an indication to switch from the first image sensor to the second image sensor, the first image sensor may be further configured to obtain third frames at the second frame rate and the second image sensor may be further configured to obtain fourth frames at the first frame rate.

In another aspect, a method may include processing first frames from a first image sensor. The first frames may be obtained at a first frame rate. The method may include storing the processed first frames in a memory. The method may include partially processing second frames from a second image sensor to obtain first camera control statistics. The second frames may be obtained at a second frame rate. The method may include receiving an indication to switch from the first image sensor to the second image sensor. The method may include obtaining third frames at the second frame rate from the first image sensor. The method may include obtaining fourth frames at the first frame rate from the second image sensor.

In another aspect, an image capture device may include a first image sensor, a second image sensor, a memory, and an image signal processor. The first image sensor may be configured to obtain first frames. The first frames may be obtained at a first frame rate. The second image sensor may be configured to obtain second frames. The second frames may be obtained at a second frame rate. The image signal processor may be configured to process the first frames from the first image sensor and store the processed first frames in the memory. The image signal processor may be configured to partially process the second frames from the second image sensor to obtain first camera control statistics. On a condition that an indication to switch from the first image sensor to the second image sensor is received, the first image sensor may be further configured to obtain third frames at the second frame rate and the second image sensor may be further configured to obtain fourth frames at the first frame rate. The image signal processor may be further configured to process the fourth frames from the second image sensor and store the processed fourth frames in the memory. The image signal processor may be further configured to partially process the third frames from the first image sensor to obtain second camera control statistics.

In another aspect, an image capture device may include a first image sensor, a second image sensor, a memory, a first image signal processor, and a second image signal processor. The first image sensor may be configured to obtain first frames. The first frames may be obtained at a first frame rate. The second image sensor may be configured to obtain second frames. The second frames may be obtained at a second frame rate. The first image signal processor may be configured to process the first frames from the first image sensor and store the processed first frames in the memory. The second image signal processor may be configured to partially process the second frames from the second image sensor to obtain first camera control statistics. On a condition that an indication to switch from the first image sensor to the second image sensor is received, the first image sensor may be further configured to obtain third frames at the second frame rate and the second image sensor may be further configured to obtain fourth frames at the first frame rate. The second image signal processor may be further configured to process the fourth frames from the second image sensor and store the processed fourth frames in the memory. The first image signal processor may be further configured to partially process the third frames from the first image sensor to obtain second camera control statistics.

In another aspect, a method may include obtaining first frames at a first frame rate from a first image sensor. The method may include obtaining second frames at a second frame rate from a second image sensor. The method may include processing the first frames from the first image sensor. The method may include storing the processed first frames in a memory. The method may include partially processing the second frames from the second image sensor to obtain first camera control statistics. The method may include receiving an indication to switch from the first image sensor to the second image sensor. The method may include obtaining third frames at the second frame rate from the first image sensor. The method may include obtaining fourth frames at the first frame rate from the second image sensor. The method may include processing the fourth frames from the second image sensor. The method may include storing the processed fourth frames in the memory. The method may include partially processing the third frames from the first image sensor to obtain second camera control statistics.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The implementations described herein are related to a method and apparatus to reduce latency during an image sensor switch while recording, without sacrificing run times. One or more implementations may include streaming from a first sensor that is currently recording at a nominal frame rate, for example, 30 frames per second (FPS). The nominal frame rate may be any frame rate between 20 FPS and 240 FPS depending on the particular use case, and 30 FPS is provided merely as an example. Simultaneously, frames from a second image sensor may be streamed at a lower frame rate, for example, 10 FPS. The lower frame rate may be any frame rate between 5 FPS and 30 FPS depending on the particular use case, and 10 FPS is provided merely as an example. The frames from the second image sensor may be streamed at a lower resolution to reduce bandwidth and power consumption. Minimal processing may be performed on the frames from the second image sensor such that only mandatory processing is performed. For example, mandatory processing may include automatic white balance and automatic exposure processing. All other processing may be optional when the sensor is in a non-recording sensor mode. This list is not exclusive and may include any algorithm that requires statistics, histograms, thumbnails, gradients, or any combination thereof, to be further applied on the image. In this way, when switching to record from the second image sensor, the sensor mode for the first image sensor is switched to non-recording and the sensor mode for the second image sensor is switched to recording. During the mode switch of the image sensors, the camera controls are already adapted to stream the content from the second image sensor. For simplicity, recording frames from a stream may be referred to as recording the stream.

Figure 1A:
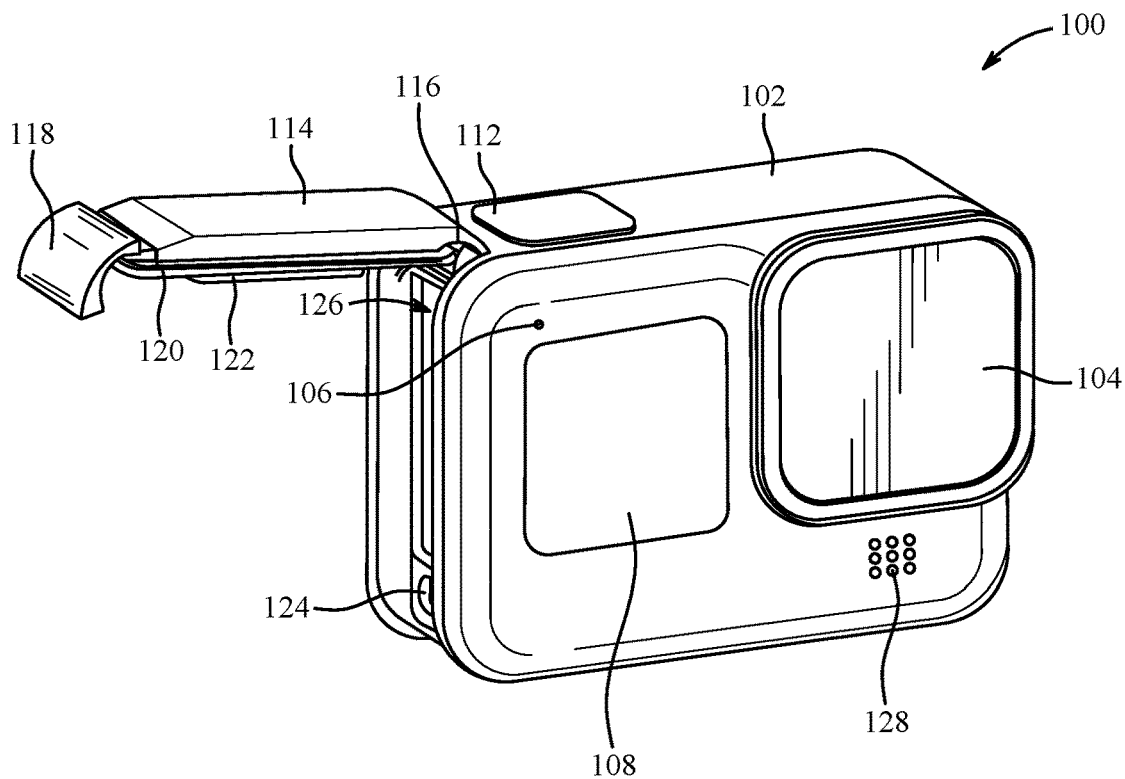
FIGS. 1A-B are isometric views of an example of an image capture device.
Figure 1B:
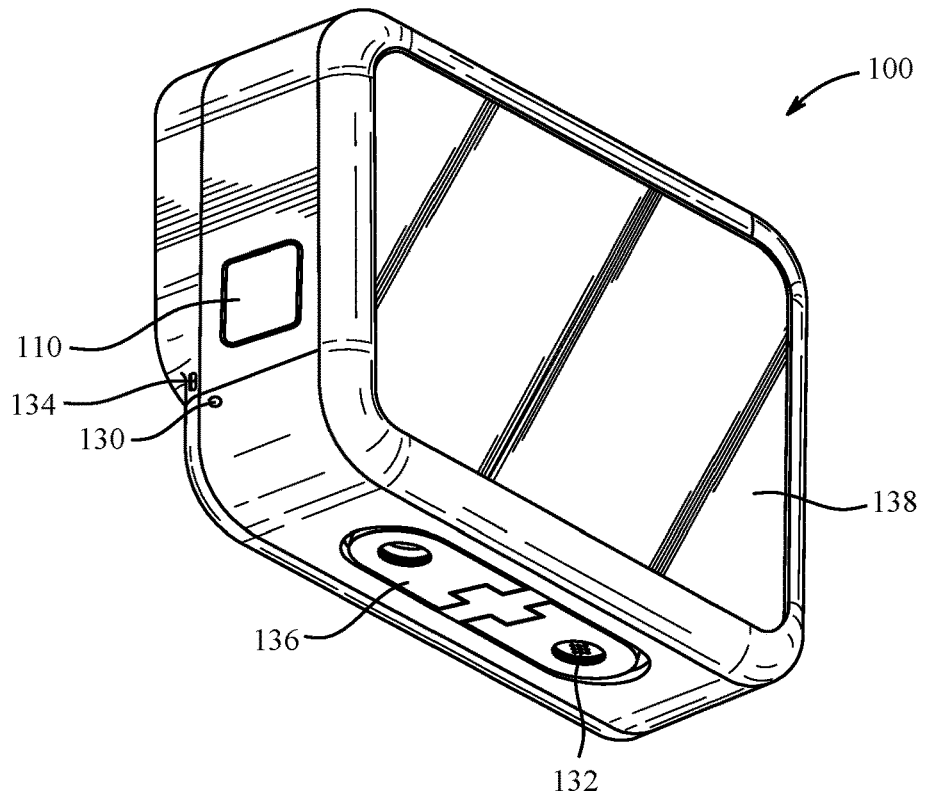

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal—oxide—semiconductor (CMOS) sensors, N-type metal—oxide—semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 4:
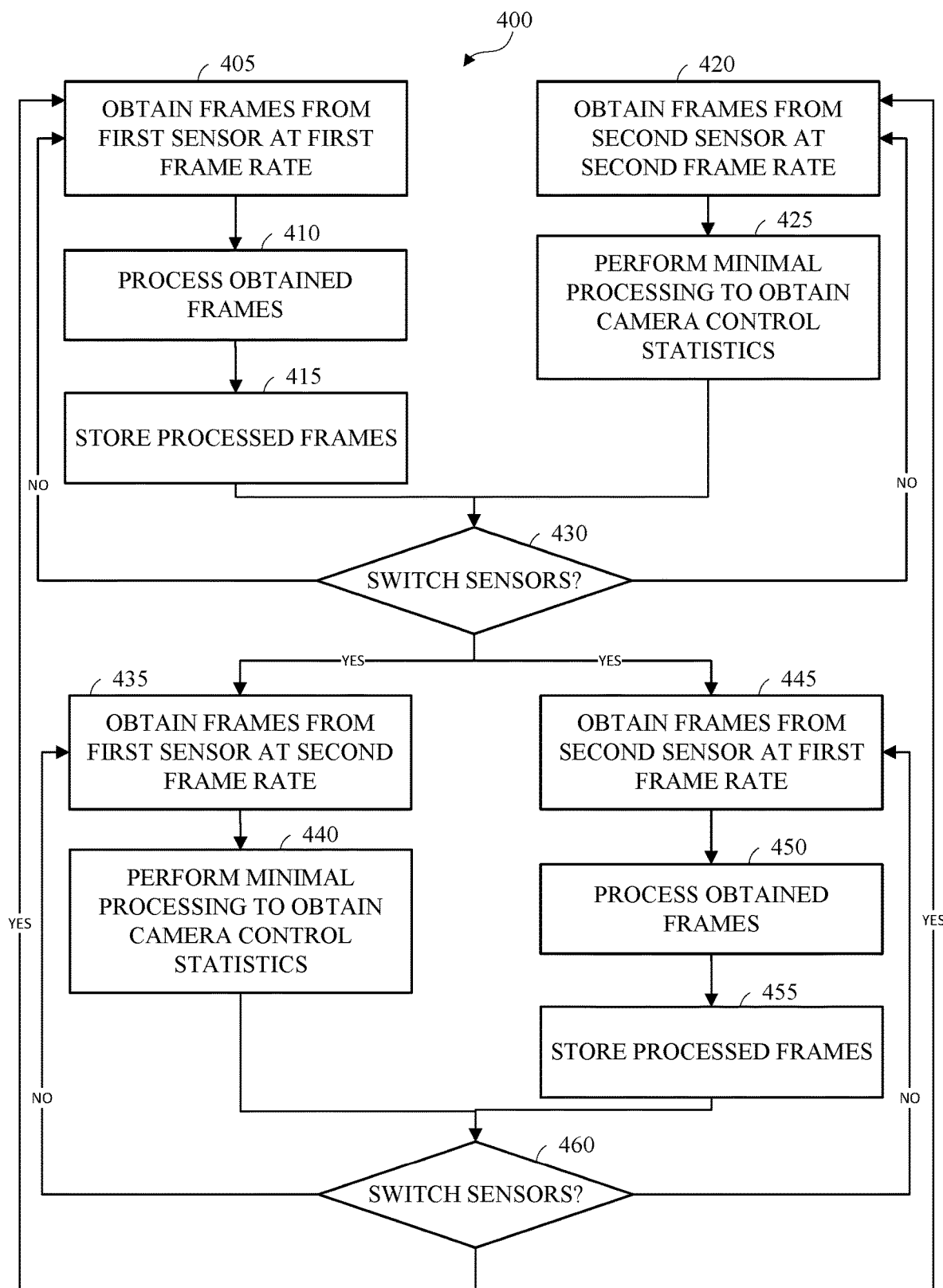
FIG. 4 is a flow diagram of an example of a method for reducing latency during a sensor switch.

The image capture device 100 may be used to implement some or all of the techniques described in this disclosure, such as the technique 400 described in FIG. 4.

Figure 2A:
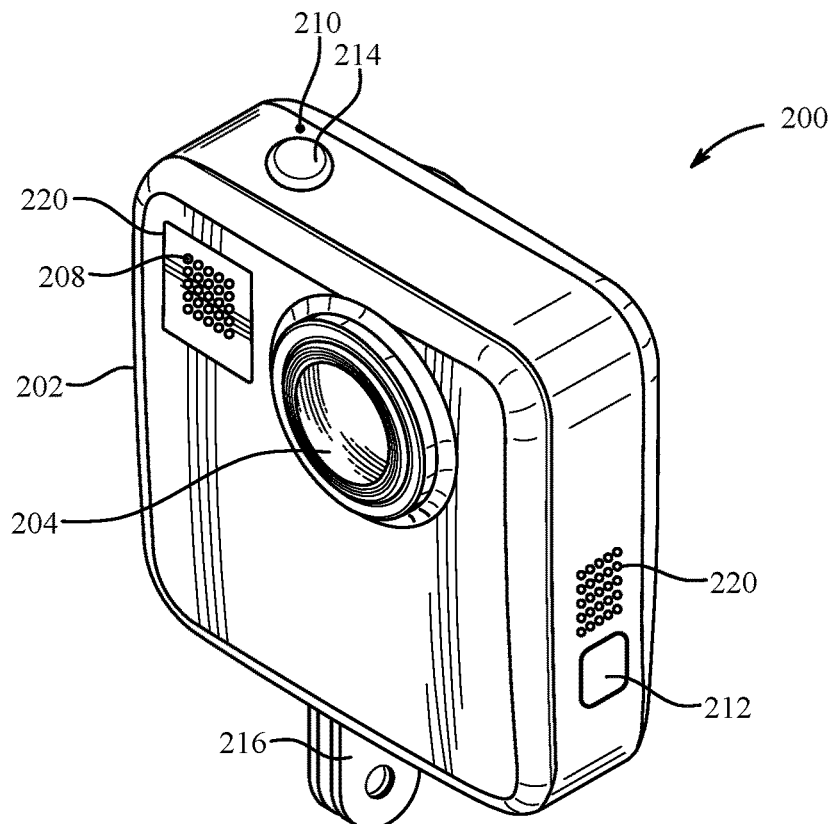
FIGS. 2A-B are isometric views of another example of an image capture device.
Figure 2B:
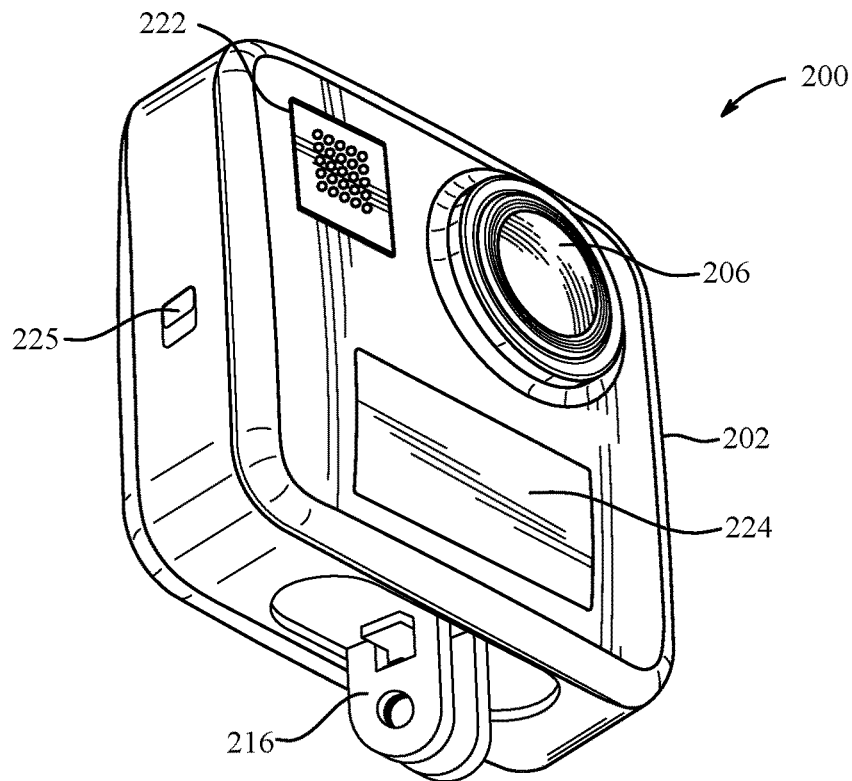

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
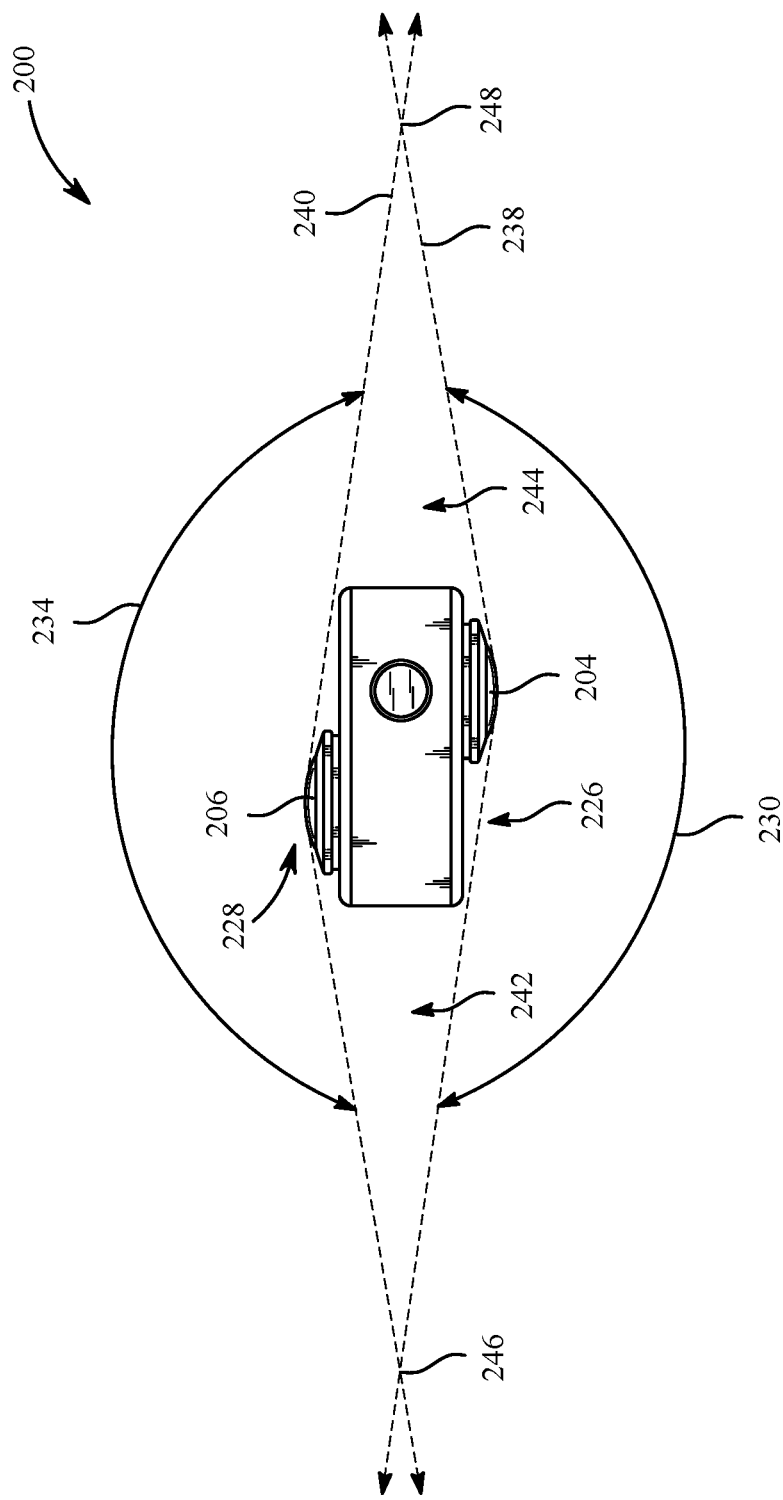
FIG. 2C is a top view of the image capture device of FIGS. 2A-B.
Figure 2D:
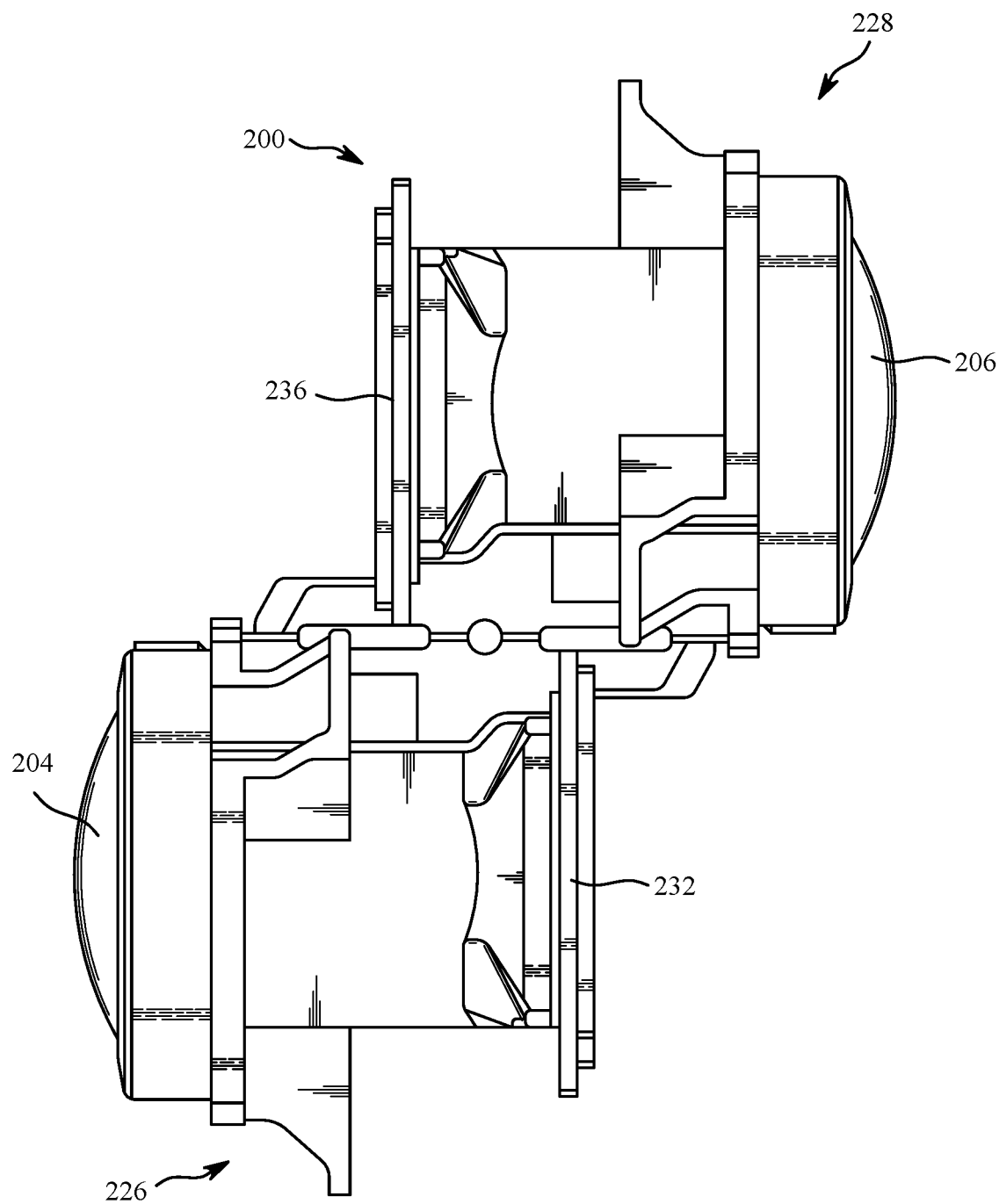
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique 400 described in FIG. 4.

Figure 3:
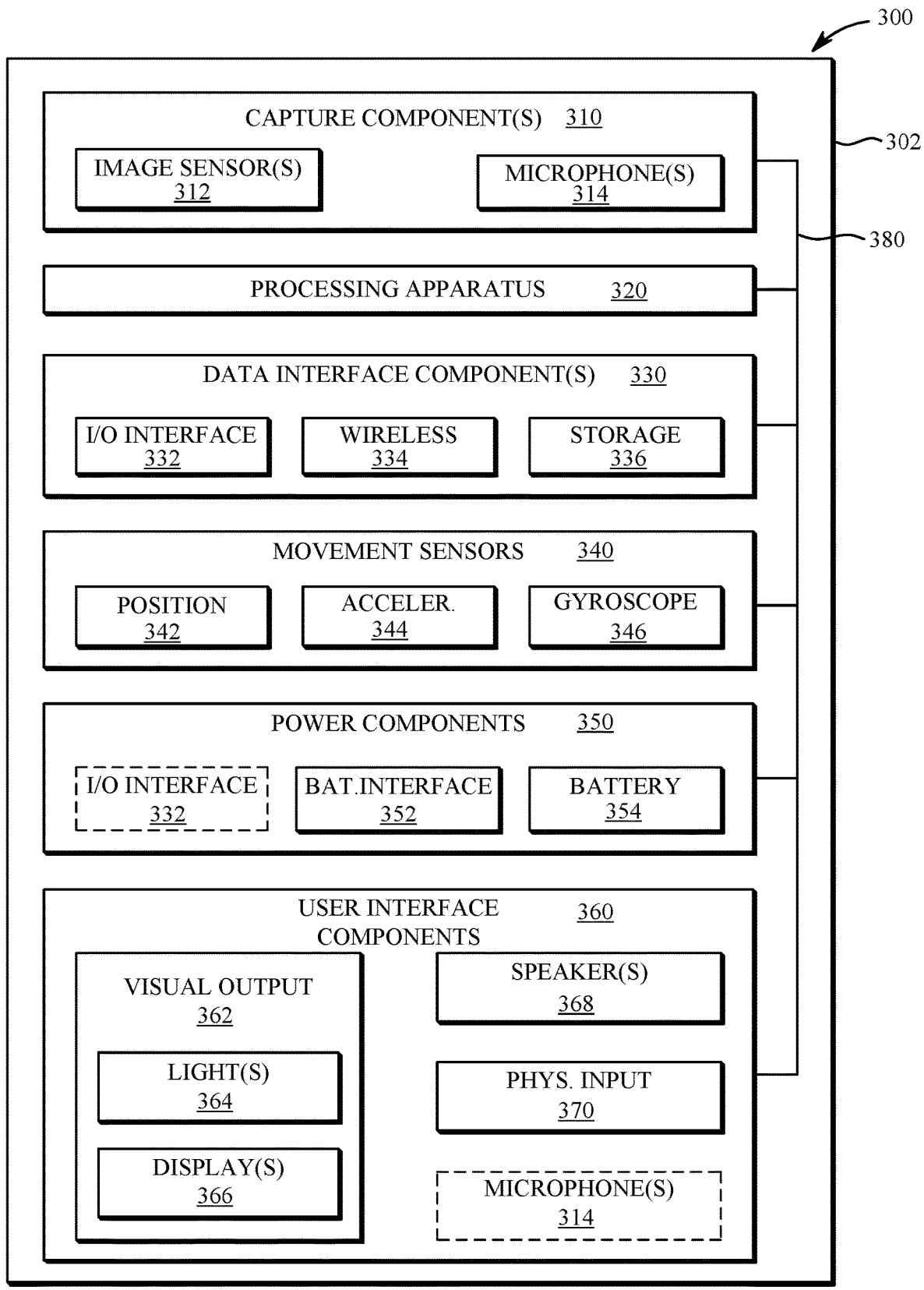
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal—oxide—semiconductor (CMOS) sensor, N-type metal—oxide—semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include the I/O interface 332, as indicated in dotted line, and the power components 350 may receive power from an external source, such as a wall plug or external battery, for operating the image capture device 300 and/or charging the battery 354 of the image capture device 300.

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300.

The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 400 described in FIG. 4.

FIG. 4 is a flow diagram of an example of a method 400 for reducing latency during a sensor switch. The method 400 may be implemented in an image capture device, such as the image capture device 200 shown in FIGS. 2A-2D. In this example, an image capture device may be recording a stream from a first image sensor and then switch to recording a stream from a second image sensor.

As shown in FIG. 4, the method 400 includes obtaining 405 frames from a first image sensor. The frames obtained from the first image sensor may be obtained at a first frame rate, for example, 30 frames per second (FPS). It is understood that the first frame rate may be any frame rate, and 30 FPS is provided merely as an example.

The method 400 includes processing 410 the frames obtained from the first image sensor and storing 415 the processed frames. Processing 410 the frames obtained from the first image sensor includes performing automatic white balance (AWB), automatic exposure (AE), global tone mapping (GTM), denoising, warping correction, local tone mapping (LTM), or any combination thereof. The processing 410 may include encoding or compressing the frames. In some implementations, the processing 410 may include implementing one or more encoding standards. In the embodiments disclosed herein, performing AWB may refer to processing based on obtained statistics to estimate a correction to be applied on the image or the application of the correction to the image itself.

The method 400 includes obtaining 420 frames from a second image sensor. The frames obtained from the second image sensor may be obtained at a second frame rate. The second frame rate may be less than the first frame rate. For example, the second frame rate may be 10 FPS or less. It is understood that the second frame rate may be any frame rate, and 10 FPS is provided merely as an example. In some implementations, the frames obtained from the second image sensor may be obtained at a lower resolution than the frames obtained from the first image sensor to reduce bandwidth and power consumption. The frames from the first image sensor and the second image sensor may be obtained simultaneously and independently.

The method 400 includes performing 425 minimal processing on the frames obtained from the second image sensor to obtain camera control statistics. Performing 425 minimal processing includes partially processing the frames through a first portion of an image processing pipeline. For example, the frames obtained from the second image sensor may be processed only for AE, AWB, GTM, or any combination thereof, to obtain camera control statistics. Partially processing the frames through the first portion of the image processing pipeline does not include high cost image processing such as, for example, denoising, warping correction, and/or LTM. The frames may be discarded once the camera control statistics have been obtained. The camera control statistics for the second image sensor may be stored until they are needed when switching the second image sensor mode to a recording mode. Processing load may be reduced since the camera control statistics for the second image sensor do not need to be recalculated at the time of the sensor mode switch.

The method 400 includes receiving 430 an indication to switch from recording the stream from the first image sensor to recording the stream from the second image sensor. The indication to switch from recording the stream from the first image sensor to recording the stream from the second image sensor may include a signal responsive to a voice command. For example, a voice command such as "Record From Sensor 1" may trigger a signal to the processor to switch from recording the stream from the first image sensor to recording the stream from the second image sensor. In another example, the processor may receive a signal responsive to an audio cue, such as a direction from which a sound originates as the indication to switch from recording the stream from the first image sensor to recording the stream from the second image sensor. For example, a microphone may detect that a sound is originating from a direction facing the second image sensor and trigger the indication to switch from recording from the first image sensor to recording from the second image sensor. In another example, the indication to switch from recording from the stream from the first image sensor to recording from the stream from the second image sensor may be a signal responsive to a button press, for example, a signal that is triggered when a user presses a button. The button may be a physical button such as a shutter button or a mode button, or the button may be a soft button such as a button displayed on an interactive touch screen.

In response to receiving 430 the indication to switch from recording from the stream from the first image sensor to recording from the stream from the second image sensor, the method 400 includes obtaining 435 frames from the first image sensor. Frames from the stream from the first image sensor are not recorded at this stage, and therefore the frames obtained from the stream from first image sensor may be obtained at the second frame rate. As discussed above, the second frame rate may be less than the first frame rate. For example, the second frame rate may be 10 FPS or less. It is understood that the second frame rate may be any frame rate, and 10 FPS is provided merely as an example. In some implementations, the frames obtained from the stream from the first image sensor may be obtained at a lower resolution than the frames obtained from the stream from the second image sensor to reduce bandwidth and power consumption when recording frames from the stream from the first image sensor.

The method 400 includes performing 440 minimal processing on the frames obtained from the first image sensor to obtain camera control statistics. Performing 440 minimal processing includes partially processing the frames through a first portion of an image processing pipeline. For example, the frames obtained from the second image sensor may be processed only for AE, AWB, GTM, or any combination thereof, to obtain camera control statistics. Partially processing the frames through the first portion of the image processing pipeline does not include high cost image processing such as, for example, denoising, warping correction, and/or LTM. The frames may be discarded once the camera control statistics have been obtained.

The method 400 includes obtaining 445 frames from the second image sensor. The stream from the second image sensor is being recorded at this stage, and therefore the frames obtained from the second image sensor may be obtained at the first frame rate, for example, 30 frames per second (FPS). It is understood that the first frame rate may be any frame rate, and 30 FPS is provided merely as an example. The frames from the first image sensor and the frames from the second image sensor may be obtained simultaneously and independently.

The method 400 includes processing 450 the frames obtained from the second image sensor and storing 455 the processed frames. Processing 450 the frames obtained from the first image sensor includes performing AWB, AE, GTM, denoising, warping correction, LTM, or any combination thereof. The processing 450 may include encoding or compressing the frames. In some implementations, the processing 450 may include implementing one or more encoding standards.

The method 400 may include receiving 460 an indication to switch from recording the stream from the second image sensor to recording the stream from the first image sensor. The indication to switch from recording the stream from the second image sensor to recording the stream from the first image sensor may include a signal responsive to a voice command. For example, a voice command such as "Record From Sensor 1" may trigger a signal to the processor to switch from recording the stream from the second image sensor to recording the stream from the first image sensor. In another example, the processor may receive a signal responsive to an audio cue, such as a direction from which a sound originates as the indication to switch from recording the stream from the second image sensor to recording the stream from the first image sensor. For example, a microphone may detect that a sound is originating from a direction facing the first image sensor and trigger the indication to switch from recording from the second image sensor to recording from the first image sensor. In another example, the indication to switch from recording from the stream from the second image sensor to recording from the stream from the first image sensor may be a signal responsive to a button press, for example, a signal that is triggered when a user presses a button. The button may be a physical button such as a shutter button or a mode button, or the button may be a soft button such as a button displayed on an interactive touch screen.

In response to receiving 460 the indication to switch from recording the stream from the second image sensor to recording the stream from the first image sensor, the method 400 returns to obtaining 405 frames from the first image sensor and obtaining 420 frames from the second image sensor. The process may then repeat as discussed above until the next indication to switch sensors is received.

Figure 5:
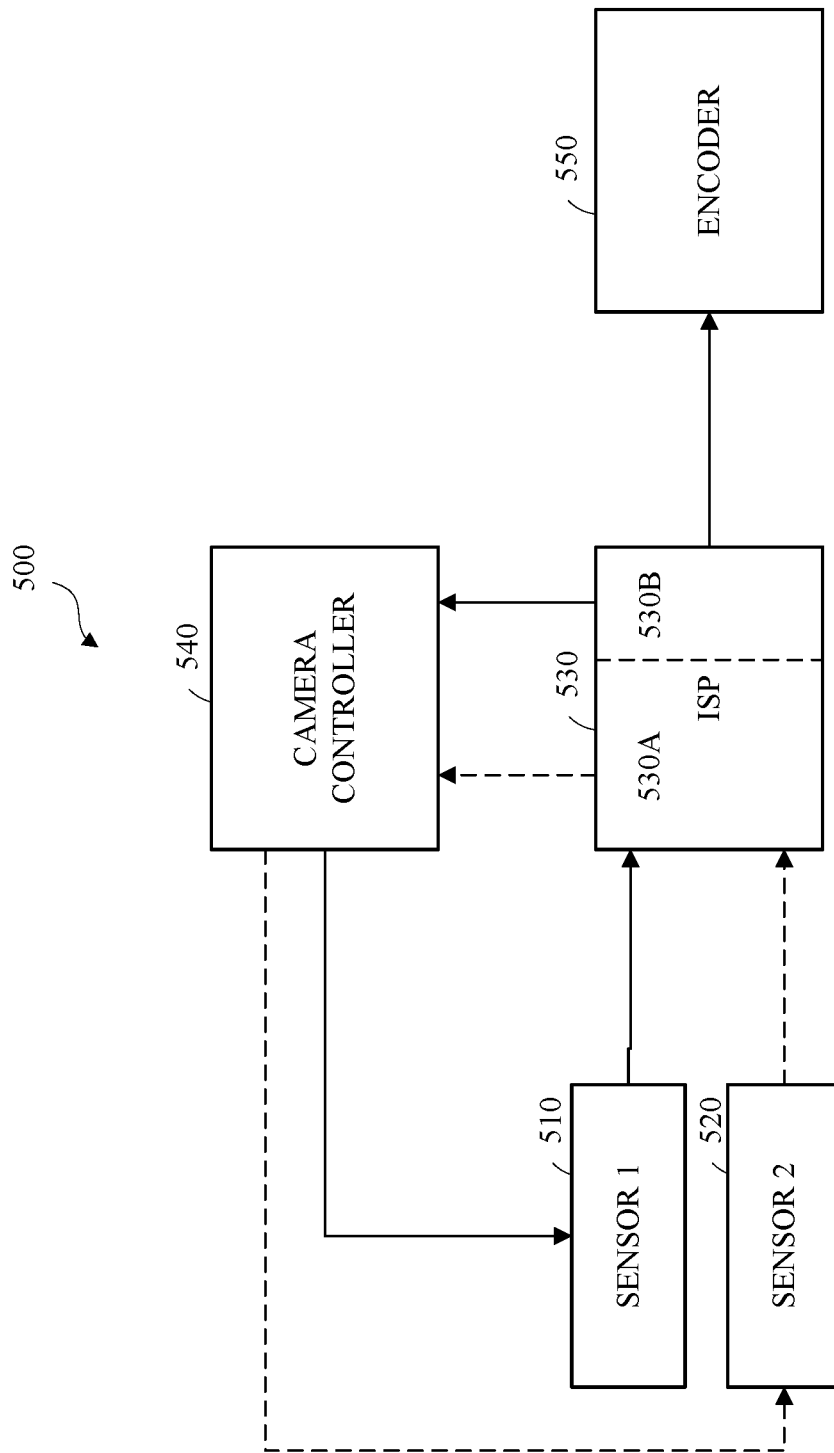
FIG. 5 is a block diagram of an example of a processing pipeline using one image signal processing (ISP) core.

FIG. 5 is a block diagram of an example of a processing pipeline 500 using one image signal processing (ISP) core. The processing pipeline 500 may be used for reducing latency during a sensor switch. The processing pipeline 500 may be implemented in an image capture device, such as the image capture device 200 shown in FIGS. 2A-2D.

As shown in FIG. 5, the processing pipeline includes a first image sensor 510, a second image sensor 520, an image signal processor (ISP) 530, a camera controller 540, and an encoder 550. In this example, the image capture device may be recording a stream from the first image sensor 510 and then switch to recording a stream from the second image sensor 520. The first image sensor 510 is configured to capture frames at a first frame rate, for example, 30 FPS. It is understood that the first frame rate may be any frame rate, and 30 FPS is provided merely as an example. The second image sensor 520 is configured to capture frames at a second frame rate. The second frame rate may be less than the first frame rate. For example, the second frame rate may be 10 FPS or less. It is understood that the second frame rate may be any frame rate, and 10 FPS is provided merely as an example. In some implementations, the frames captured by the second image sensor 520 may be captured at a lower resolution than the frames captured from the first image sensor 510 to reduce bandwidth and power consumption. The frames from the first image sensor 510 and the second image sensor 520 may be captured simultaneously and independently.

As shown in FIG. 5, the ISP 530 comprises a first portion 530A and a second portion 530B. The ISP 530 is configured to obtain the frames from the first image sensor 510 and process the frames using the first portion 530A and the second portion 530B. The first portion 530A of the ISP 530 is configured to perform AWB, AE and GTM on the frames obtained from the first image sensor 510 to obtain camera control statistics. The second portion 530B of the ISP 530 is configured to perform denoising, warping correction, LTM, or any combination thereof, on the frames obtained from the first image sensor 510. The camera control statistics of the first image sensor 510 may be stored in a memory. The camera controller 540 is configured to update one or more settings of the first image sensor 510 based on the camera control statistics. The ISP 530 is configured to send the processed frames to the encoder 550. The encoder 550 is configured to encode the processed frames into a video format suitable for recording, playback, or both and output the processed video.

The ISP 530 is configured to obtain the frames from the second image sensor 520 and process the frames using the first portion 530A. The first portion 530A of the ISP 530 is configured to perform AWB, AE and GTM on the frames obtained from the second image sensor 520 to obtain camera control statistics. The camera control statistics of the second image sensor 520 may be stored in a memory. The camera controller 540 is configured to update one or more settings of the second image sensor 520 based on the camera control statistics. Since the stream from the second image sensor 520 is not being recorded at this stage in this example, the second portion 530B of the ISP 530 may be disabled to reduce processing load.

The camera controller 540 may be configured to receive an indication to switch from recording the stream from the first image sensor 510 to recording the stream from the second image sensor 520. The indication to switch from recording the stream from the first image sensor 510 to recording the stream from the second image sensor 520 may include a signal responsive to a voice command. For example, a voice command such as "Record From Sensor 1" may trigger a signal to the camera controller 540 to switch from recording the stream from the first image sensor 510 to recording the stream from the second image sensor 520. In another example, the camera controller 540 may receive a signal responsive to an audio cue, such as a direction from which a sound originates as the indication to switch from recording the stream from the first image sensor 510 to recording the stream from the second image sensor 520. For example, a microphone may detect that a sound is originating from a direction facing the second image sensor 520 and trigger the indication to switch from recording from the first image sensor 510 to recording from the second image sensor 520. In another example, the indication to switch from recording from the stream from the first image sensor 510 to recording from the stream of the second image sensor 520 may be a signal responsive to a button press, for example, a signal that is triggered when a user presses a button. The button may be a physical button such as a shutter button or a mode button, or the button may be a soft button such as a button displayed on an interactive touch screen.

In response to receiving the indication to switch from recording the stream from the first image sensor 510 to recording the stream from the second image sensor 520, the camera controller 540 may be configured to change the sensor modes of the first image sensor 510 and the second image sensor 520. The stream from the first image sensor 510 is not recorded at this stage, and therefore the frames captured from the first image sensor 510 may be captured at the second frame rate. As discussed above, the second frame rate may be less than the first frame rate. For example, the second frame rate may be 10 FPS or less. It is understood that the second frame rate may be any frame rate, and 10 FPS is provided merely as an example. In some implementations, the frames captured by the first image sensor 510 may be captured at a lower resolution than the frames captured by the second image sensor 520 to reduce bandwidth and power consumption when recording the stream from the first image sensor 510.

When the sensor mode of the second image sensor 520 is switched to recording mode, the ISP 530 is configured to obtain the frames from the second image sensor 520 and process the frames using the first portion 530A and the second portion 530B. The first portion 530A of the ISP 530 is configured to perform AWB, AE and GTM on the frames obtained from the second image sensor 520 to obtain camera control statistics. The second portion 530B of the ISP 530 is configured to perform denoising, warping correction, LTM, or any combination thereof, on the frames obtained from the second image sensor 520. The camera control statistics of the second image sensor 520 may be stored in a memory. The camera controller 540 is configured to update one or more settings of the second image sensor 520 based on the camera control statistics. The ISP 530 is configured to send the processed frames to the encoder 550. The encoder 550 is configured to encode the processed frames into a video format suitable for recording, playback, or both and output the processed video.

When the sensor mode of the first image sensor 510 is switched to non-recording mode, the ISP 530 is configured to obtain the frames from the first image sensor 510 and process the frames using the first portion 530A. The first portion 530A of the ISP 530 is configured to perform AWB, AE and GTM on the frames obtained from the first image sensor 510 to obtain camera control statistics. The camera control statistics of the first image sensor 510 may be stored in a memory. The camera controller 540 is configured to update one or more settings of the first image sensor 510 based on the camera control statistics. Since the stream from the first image sensor 510 is not being recorded at this stage in this example, the second portion 530B of the ISP 530 may be disabled to reduce processing load.

Figure 6:
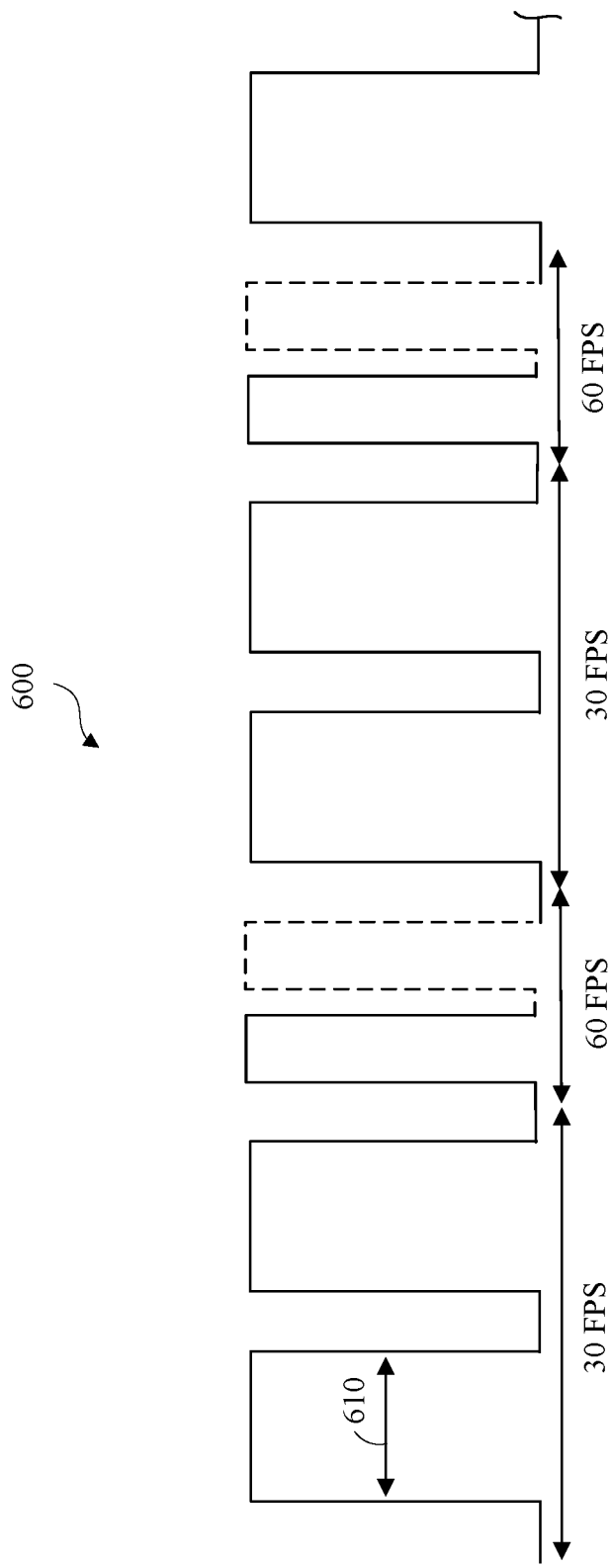
FIG. 6 is a graph showing an example of a processing timeline of two sensors using one ISP core.

FIG. 6 is a graph showing an example of a processing timeline 600 of two sensors using one ISP core. In this example, the image capture device may be recording a stream from a first image sensor, such as the first image sensor 510 shown in FIG. 5 while the stream from a second sensor, such as the second image sensor 520 shown in FIG. 5 is not being recorded. At 30 FPS, the duration 610 to process each frame is approximately 33 ms. Frames received from the first image sensor are shown in a solid line and frames received from the second image sensor are shown in a dashed line. As shown in FIG. 6, with one ISP core, the ISP core processes frames at 30 FPS except when it receives frames from the second image sensor. When the ISP core receives frames from the second image sensor, the ISP core processes the frames at 60 FPS as shown in FIG. 6.

Figure 7:
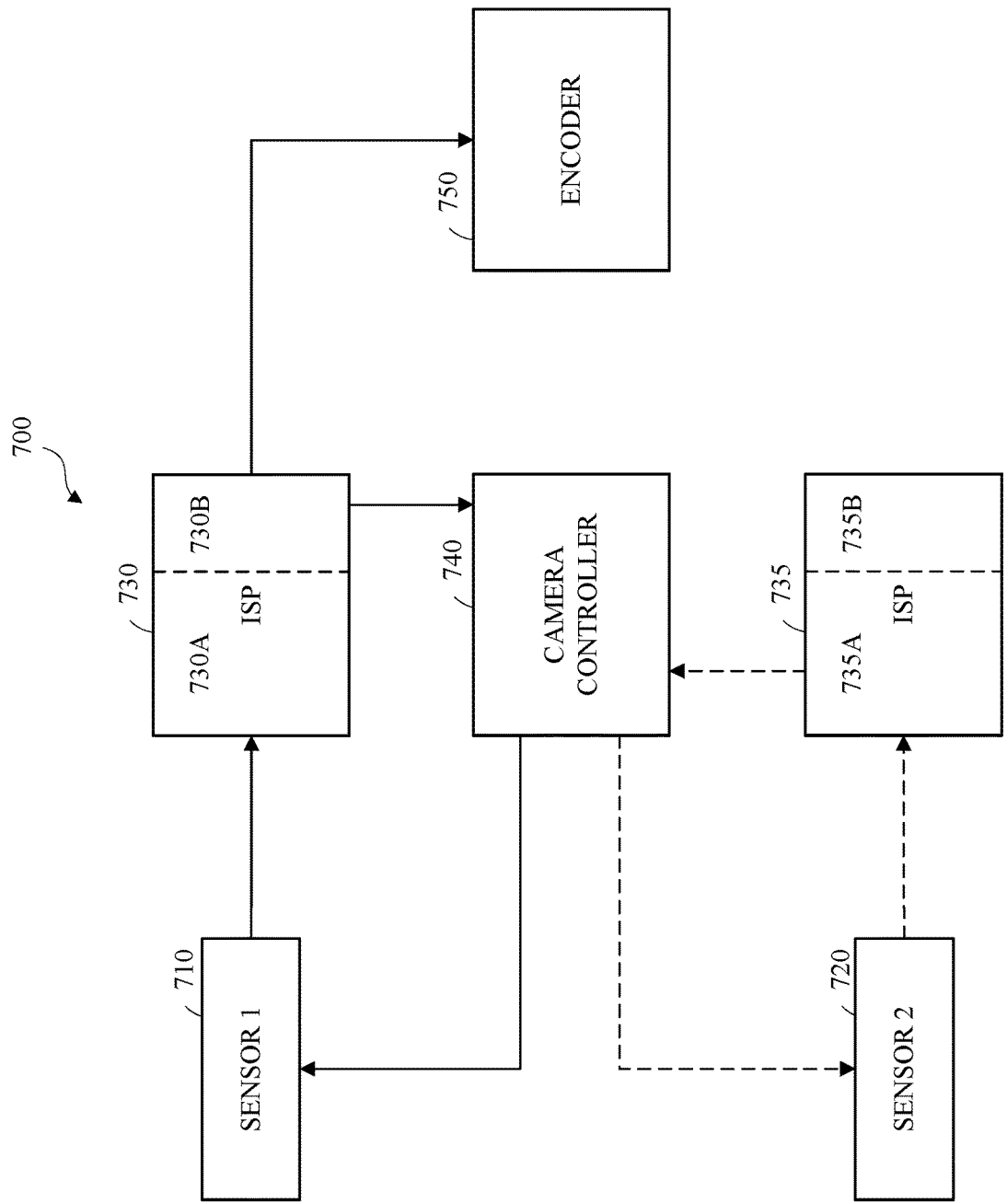
FIG. 7 is a block diagram of an example of a processing pipeline using two ISP cores.

FIG. 7 is a block diagram of an example of a processing pipeline 700 using two ISP cores. The processing pipeline 700 may be used for reducing latency during a sensor switch. The processing pipeline 700 may be implemented in an image capture device, such as image capture device 200 shown in FIGS. 2A-2D.

As shown in FIG. 7, the processing pipeline includes a first image sensor 710, a second image sensor 720, a first ISP 730, a second ISP 735, a camera controller 740, and an encoder 750. In this example, the image capture device may be recording a stream from the first image sensor 710 and then switch to recording a stream from the second image sensor 720. The first image sensor 710 is configured to capture frames at a first frame rate, for example 30 FPS. It is understood that the first frame rate may be any frame rate, and 30 FPS is provided merely as an example. The second image sensor 720 is configured to capture frames at a second frame rate. The second frame rate may be less than the first frame rate. For example, the second frame rate may be 10 FPS or less. It is understood that the second frame rate may be any frame rate, and 10 FPS is provided merely as an example. In some implementations, the frames captured by the second image sensor 720 may be captured at a lower resolution than the frames captured from the first image sensor 710 to reduce bandwidth and power consumption. The frames from the first image sensor 710 and the second image sensor 720 may be captured simultaneously and independently.

As shown in FIG. 7, the first ISP 730 comprises a first portion 730A and a second portion 730B. The ISP 730 is configured to obtain the frames from the first image sensor 710 and process the frames using the first portion 730A and the second portion 730B. The first portion 730A of the first ISP 730 is configured to perform AWB, AE and GTM on the frames obtained from the first image sensor 710 to obtain camera control statistics. The second portion 730B of the first ISP 730 is configured to perform denoising, warping correction, and LTM on the frames obtained from the first image sensor 710. The camera control statistics of the first image sensor 710 may be stored in a memory. The camera controller 740 is configured to update one or more settings of the first image sensor 710 based on the camera control statistics. The first ISP 730 is configured to send the processed frames to the encoder 750. The encoder 750 is configured to encode the processed frames into a video format suitable for recording, playback, or both and output the processed video.

The second ISP 735 comprises a first portion 735A and a second portion 735B. The first portion 735A of the second ISP 735 is configured to perform AWB, AE and GTM on the frames obtained from the second image sensor 710 to obtain camera control statistics. The second portion 735B of the second ISP 735, when enabled, is configured to perform denoising, warping correction, and LTM on the frames obtained from the second image sensor 720. The second ISP 735 is configured to obtain the frames from the second image sensor 720 and process the frames using the first portion 735A. The first portion 735A of the second ISP 735 is configured to perform AWB, AE and GTM on the frames obtained from the second image sensor 720 to obtain camera control statistics. The camera control statistics of the second image sensor 720 may be stored in a memory. The camera controller 740 is configured to update one or more settings of the second image sensor 720 based on the camera control statistics. Since the stream from the second image sensor 720 is not being recorded at this stage in this example, the second portion 735B of the second ISP 735 may be disabled to reduce processing load.

The camera controller 740 may be configured to receive an indication to switch from recording the stream from the first image sensor 710 to recording the stream from the second image sensor 720. The indication to switch from recording the stream from the first image sensor 710 to recording the stream from the second image sensor 720 may include a signal responsive to a voice command. For example, a voice command such as "Record From Sensor 1" may trigger a signal to the camera controller 740 to switch from recording the stream from the first image sensor 710 to recording the stream from the second image sensor 720. In another example, the camera controller 740 may receive a signal responsive to an audio cue, such as a direction from which a sound originates as the indication to switch from recording the stream from the first image sensor 710 to recording the stream from the second image sensor 720. For example, a microphone may detect that a sound is originating from a direction facing the second image sensor 720 and trigger the indication to switch from recording from the first image sensor 710 to recording from the second image sensor 720. In another example, the indication to switch from recording from the stream from the first image sensor 710 to recording from the stream of the second image sensor 720 may be a signal responsive to a button press, for example, a signal that is triggered when a user presses a button. The button may be a physical button such as a shutter button or a mode button, or the button may be a soft button such as a button displayed on an interactive touch screen.

In response to receiving the indication to switch from recording the stream from the first image sensor 710 to recording the stream from the second image sensor 720, the camera controller 740 may be configured to change the sensor modes of the first image sensor 710 and the second image sensor 720. The stream from the first image sensor 710 is not recorded at this stage, and therefore the frames captured from the first image sensor 710 may be captured at the second frame rate. As discussed above, the second frame rate may be less than the first frame rate. For example, the second frame rate may be 10 FPS or less. It is understood that the second frame rate may be any frame rate, and 10 FPS is provided merely as an example. In some implementations, the frames captured by the first image sensor 710 may be captured at a lower resolution than the frames captured by the second image sensor 720 to reduce bandwidth and power consumption when recording the stream from the first image sensor 710.

When the sensor mode of the second image sensor 720 is switched to recording mode, the second ISP 735 is configured to obtain the frames from the second image sensor 720 and process the frames using the first portion 735A and the second portion 735B. The first portion 735A of the second ISP 735 is configured to perform AWB, AE and GTM on the frames obtained from the second image sensor 720 to obtain camera control statistics. The second portion 735B of the second ISP 735 is configured to perform denoising, warping correction, and LTM on the frames obtained from the second image sensor 720. The camera control statistics of the second image sensor 720 may be stored in a memory. The camera controller 740 is configured to update one or more settings of the second image sensor 720 based on the camera control statistics. The second ISP 735 is configured to send the processed frames to the encoder 750. The encoder 750 is configured to encode the processed frames into a video format suitable for recording, playback, or both and output the processed video.

When the sensor mode of the first image sensor 710 is switched to non-recording mode, the first ISP 730 is configured to obtain the frames from the first image sensor 710 and process the frames using the first portion 730A. The first portion 730A of the first ISP 730 is configured to perform AWB, AE, and GTM on the frames obtained from the first image sensor 710 to obtain camera control statistics. The camera control statistics of the first image sensor 710 may be stored in a memory. The camera controller 740 is configured to update one or more settings of the first image sensor 710 based on the camera control statistics. Since the stream from the first image sensor 710 is not being recorded at this stage in this example, the second portion 730B of the first ISP 730 may be disabled to reduce processing load.

Figure 8A:
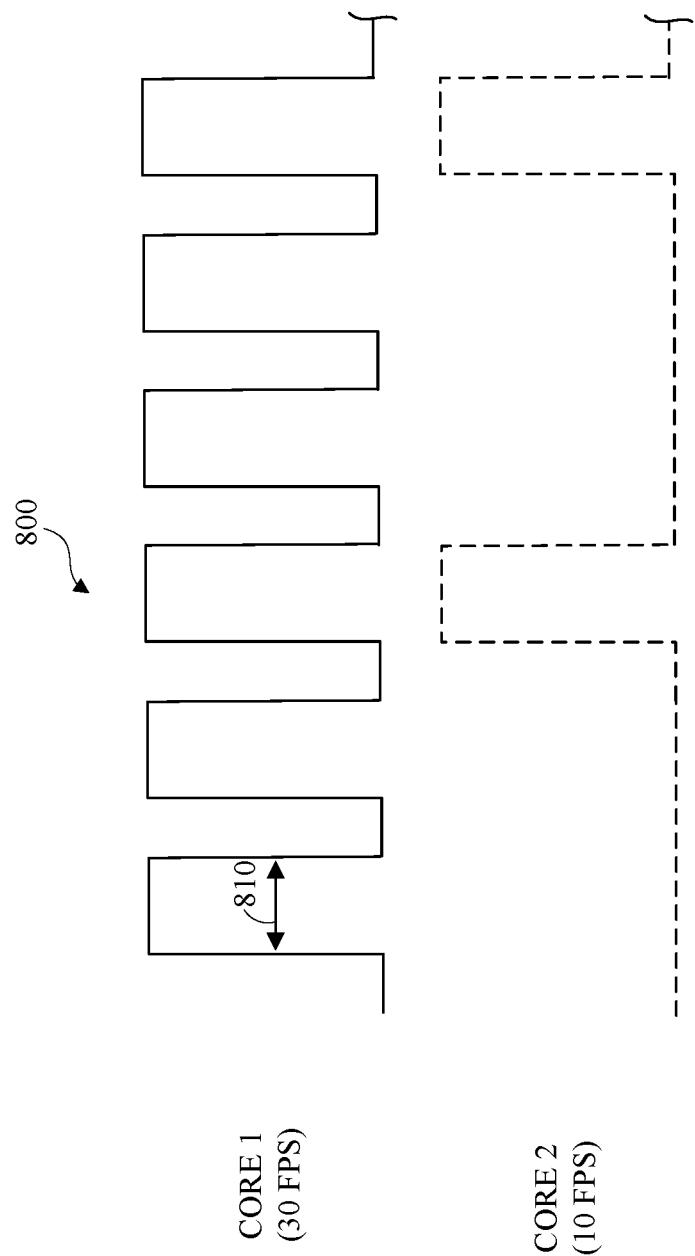
FIG. 8A is a graph showing an example of a processing timeline of two sensors using two ISP cores.

FIG. 8A is a graph showing an example of a processing timeline 800 of two sensors using two ISP cores. In this example, the image capture device may be recording a stream from a first image sensor, such as the first image sensor 510 shown in FIG. 5 while the stream from a second sensor, such as the second image sensor 520 shown in FIG. 5 is not being recorded. At 30 FPS, the duration 810 to process each frame is approximately 33 ms. Frames received from the first image sensor are shown in a solid line and frames received from the second image sensor are shown in a dashed line. As shown in FIG. 8A, with two ISP cores, both image sensors may be processed independently at different frame rates. As shown in FIG. 8A, the processing duration of each frame received from the first images sensor and the second image sensor are the same. This approach may depend on the ISP architecture and its ability to run each core at different frequencies. In an example where the ISP cores cannot be run at different frequencies, one or more blocks may be disabled to reduce power consumption.

Figure 8B:
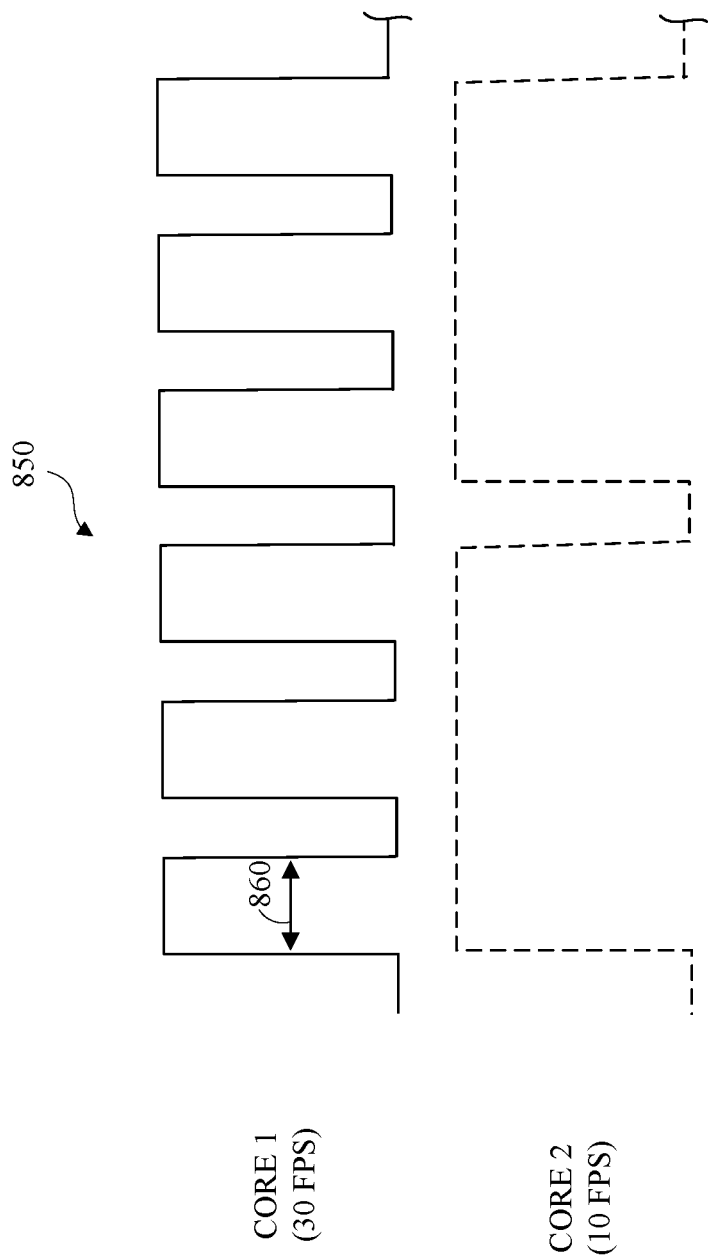
FIG. 8B is a graph showing another example of a processing timeline of two sensors using two processing cores.

FIG. 8B is a graph showing another example of a processing timeline 850 of two sensors using two processing cores. In this example, the image capture device may be recording a stream from a first image sensor, such as the first image sensor 510 shown in FIG. 5 while the stream from a second sensor, such as the second image sensor 520 shown in FIG. 5 is not being recorded. At 30 FPS, the duration 860 to process each frame is approximately 33 ms. Frames received from the first image sensor are shown in a solid line and frames received from the second image sensor are shown in a dashed line. As shown in FIG. 8B, with two ISP cores, both image sensors may be processed independently at different frame rates. As shown in FIG. 8B, the duration to process a frame received from the second image sensor is the same as the duration to process three frames received from the first image sensor. This approach may depend on the ISP architecture and its ability to run each core at different frequencies. In an example where the ISP cores cannot be run at different frequencies, one or more blocks may be disabled to reduce power consumption.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
an image signal processor configured to:
process first frames obtained at a first frame rate from a first image sensor to obtain processed first frames, wherein the processed first frames include warping correction;
obtain first camera control statistics based on partially processed second frames obtained at a second frame rate from a second image sensor, wherein the partially processed second frames are excluded from warping correction and the second frame rate is different than the first frame rate;
the first image sensor further configured to obtain third frames at the second frame rate responsive to an audio cue associated with a direction of an audio signal; and
the second image sensor further configured to obtain fourth frames at the first frame rate based on the audio cue.

2. The image capture device of claim 1, wherein the image signal processor is further configured to:
receive an indication to switch from the first image sensor to the second image sensor.

3. The image capture device of claim 2, wherein the indication to switch from the first image sensor to the second image sensor is a signal responsive to the audio cue.

4. The image capture device of claim 3, wherein the audio cue is a voice command.

5. The image capture device of claim 1, wherein the image signal processor is further configured to:
obtain second camera control statistics based on a processing of the third frames.

6. The image capture device of claim 5, wherein the image signal processor is further configured to:
process the fourth frames based on the second camera control statistics to reduce processing load.

7. The image capture device of claim 1, wherein the first frame rate is greater than the second frame rate.

8. An image capture device comprising:
a first image sensor configured to obtain first frames at a first frame rate;
a second image sensor configured to obtain second frames at a second frame rate;
a memory;
a first image signal processor configured to process the first frames from the first image sensor to obtain processed first frames, wherein the processed first frames include warping correction, and store the processed first frames in the memory; and
a second image signal processor configured to partially process the second frames from the second image sensor to obtain first camera control statistics, wherein the partially processed second frames are excluded from warping correction;
the first image sensor further configured to obtain third frames at the second frame rate based on an indication to switch from the first image sensor to the second image sensor, and
the second image sensor further configured to obtain fourth frames at the first frame rate based on the indication, wherein the first frame rate is greater than the second frame rate.

9. The image capture device of claim 8, wherein the indication to switch from the first image sensor to the second image sensor is a signal responsive to an audio cue.

10. The image capture device of claim 9, wherein the audio cue is associated with a direction of an audio signal.

11. The image capture device of claim 10, wherein the direction is facing the second image sensor.

12. The image capture device of claim 8, wherein the second image signal processor is further configured to process the second frames by performing one or more of automatic white balance (AWB), automatic exposure (AE), and global tone mapping (GTM) to obtain the first camera control statistics, wherein performing AWB includes estimating a correction to be applied.

13. The image capture device of claim 12, wherein the second image signal processor is configured to exclude denoising to partially process the second frames.

14. The image capture device of claim 8, further comprising:
an encoder configured to encode the first frames and subsequently encode the fourth frames.

15. A method comprising:
processing first frames obtained from a first image sensor at a first frame rate to obtain processed first frames, wherein the processed first frames include warping correction;
obtaining first camera control statistics based on partially processed second frames obtained from a second image sensor at a second frame rate, wherein the partially processed second frames are excluded from warping correction and the second frame rate is different than the first frame rate;
obtaining third frames at the second frame rate responsive to an audio cue associated with a direction of an audio signal; and
obtaining fourth frames at the first frame rate based on the audio cue.

16. The method of claim 15, further comprising:
receiving an indication to switch from the first image sensor to the second image sensor.

17. The method of claim 16, wherein the indication to switch from the first image sensor to the second image sensor is a signal responsive to the audio cue.

18. The method of claim 17, wherein the audio cue is a voice command.

19. The method of claim 15, further comprising:
obtaining second camera control statistics based on a processing of the third frames.

20. The method of claim 15, wherein the first frame rate is greater than the second frame rate.

* * * * *